(12) United States Patent
Kwon (10) Patent No.: US 11,617,634 B2
(45) Date of Patent: Apr. 4, 2023

(54) ORTHODONTIC BRACKET HAVING LIGATING MEMBER

(71) Applicant: MEDICEN CO., LTD, Seoul (KR)

(72) Inventor: Soon Yong Kwon, Seoul (KR)

(73) Assignee: MEDICEN CO., LTD, Seoul (KR)

( * ) Notice: Subject to any disclaimer, the term of this patent is extended or adjusted under 35 U.S.C. 154(b) by 107 days.

(21) Appl. No.: 16/854,899

(22) Filed: Apr. 22, 2020

(65) Prior Publication Data

US 2020/0330190 A1 Oct. 22, 2020

(30) Foreign Application Priority Data

Apr. 22, 2019 (KR) .................. 10-2019-0046638

(51) Int. Cl.
*A61C 7/30* (2006.01)
*A61C 7/28* (2006.01)

(52) U.S. Cl.
CPC .............. *A61C 7/303* (2013.01); *A61C 7/287* (2013.01)

(58) Field of Classification Search
CPC ................................ A61C 7/303; A61C 7/287
See application file for complete search history.

(56) References Cited

U.S. PATENT DOCUMENTS

| | | | | |
|---|---|---|---|---|
| 2010/0261131 A1* | 10/2010 | Ruiz-Vela | ............... | A61C 7/303 433/10 |
| 2014/0134563 A1* | 5/2014 | Voudouris | ............... | A61C 7/285 433/11 |
| 2014/0212828 A1* | 7/2014 | Falcone | ................... | A61C 7/30 433/10 |
| 2015/0173859 A1* | 6/2015 | Lin | ........................ | A61C 7/287 433/10 |
| 2016/0051343 A1* | 2/2016 | Voudouris | ............... | A61C 7/287 433/14 |
| 2017/0042641 A1* | 2/2017 | Voudouris | ............... | A61C 7/287 |
| 2017/0100217 A1* | 4/2017 | Lopes | ...................... | A61C 7/30 |
| 2017/0135787 A1* | 5/2017 | Lopes | ...................... | A61C 7/34 |

FOREIGN PATENT DOCUMENTS

KR 20190008708 A * 1/2019

* cited by examiner

*Primary Examiner* — Nicholas D Lucchesi
(74) *Attorney, Agent, or Firm* — Park, Kim & Suh, LLC

(57) ABSTRACT

Disclosed is an orthodontic bracket including a bracket body having a slot into which an orthodontic wire is inserted, a bracket cover mounted on the bracket body and configured to open and close the slot, and a ligating member provided in the bracket cover and configured to selectively block the slot so as to confine the orthodontic wire in the slot. The orthodontic bracket may precisely and consistently transmit force, for example, torque, of the orthodontic wire to a tooth, and minimize or prevent factors contributing to failure, such as deformation of or damage to the ligating member due to opening and closing of the slot.

19 Claims, 13 Drawing Sheets

ORTHODONTIC BRACKET HAVING LIGATING MEMBER

CROSS-REFERENCE TO RELATED APPLICATION

This application claims the benefit of Korean Patent Application No. 10-2019-0046638, filed on Apr. 22, 2019, which is hereby incorporated by reference as if fully set forth herein.

BACKGROUND OF THE INVENTION

Field of the Invention

The present invention relates to an orthodontic bracket used in orthodontics, and more particularly to an orthodontic bracket having a structure which may open and close a slot, into which an orthodontic wire is inserted, and stably confine the orthodontic wire in the slot.

Description of the Related Art

Orthodontics (correction of irregularities of the teeth) refers to dental treatment for correcting irregularities of the teeth, bimaxillary prognathism, and malocclusion using a fixed or removable orthodontic device. Orthodontics has a medical function of correcting irregularities of the teeth that may cause inconvenience in daily life, and an aesthetic function of beautifying the face by correcting the malpositioned teeth.

As materials used in orthodontic instruments, metal has been mainly used, but recently ceramic has come to be frequently used for the orthodontic treatment. For example, a bracket formed of ceramic is adhered to an anterior region, and a bracket formed of metal is adhered to the molars, i.e., a posterior region, but if the bracket formed of ceramic is used, costs are increased compared to the bracket formed of metal.

The brackets are orthodontic instruments used for performing orthodontic treatment, as described above. The brackets are adhered to the surfaces of teeth to be corrected, and an orthodontic wire such as an arc wire is ligated into the slot formed on the brackets. Accordingly, torque of the orthodontic wire is consistently transmitted to the teeth through the brackets so as to perform the orthodontic treatment.

As described above, in order to perform general orthodontic treatment, brackets and an orthodontic wire are used, the brackets support the orthodontic wire in a state in which the brackets are fixed to teeth surfaces (the surfaces of the teeth), and orthodontic force applied by the orthodontic wire is transmitted to the teeth through the brackets on the respective teeth.

The brackets, i.e., the orthodontic brackets, are generally adhered to the surfaces of the teeth using a dental adhesive resin. Each bracket generally has a slot-type structure in which a slot is formed in the front surface of the bracket so that the orthodontic wire is inserted into the slot, and in this case, a bracket base is attached to the surface of the tooth and the angle of the slot is very important in order to precisely perform the orthodontic treatment.

In order to ligate the orthodontic wire inserted into the slots in the brackets, the brackets are generally provided with wings for ligation. Therefore, after the orthodontic wire is inserted into the slots in the brackets, a wire binding member, for example, a ligating rubber band, is wound on the wings so as to prevent release of the orthodontic wire.

A conventional orthodontic bracket includes a bracket body having wings for binding a rubber band and a slot formed on the bracket body, and a bracket base configured to support the bracket body. In addition, a self-ligating bracket, which is a kind of orthodontic bracket, prevents release of the orthodontic wire using a clip-type ligating member coupled to a bracket body having a slot therein, and the ligating member opens and closes the slot.

SUMMARY OF THE INVENTION

It is an object of the present invention to provide an orthodontic bracket which may stably confine an orthodontic wire in a slot and precisely and consistently transmit force of the orthodontic wire to a tooth.

In accordance with an aspect of the present invention, the above and other objects can be accomplished by the provision of an orthodontic bracket including a bracket body configured to have a slot into which an orthodontic wire is inserted, a bracket cover mounted on the bracket body and configured to open and close the slot, and a ligating member provided in the bracket cover and configured to selectively block the slot so as to confine the orthodontic wire in the slot.

The bracket cover may be movably provided on the bracket body. In other words, the bracket cover is provided on the bracket body so as to be movable.

The bracket cover may be slidably provided on the bracket body so as to open and close the slot. In other words, the bracket cover is provided on the bracket body so as to be slidable, and thus opens and closes the slot.

And the bracket body supports the bracket cover so as to guide sliding movement of the bracket cover, and prevents the bracket cover from being separated from the bracket body in a thickness direction of the bracket body.

Guide rails configured to guide movement of the bracket cover and to prevent the bracket cover from being separated from the bracket body are provided on the bracket body. The guide rails may be formed on both sides of the bracket body.

The bracket body may comprise a wire supporter having the slot therein, and a base adherable to a surface of a tooth is provided on one side of the wire supporter.

The wire supporter may comprise a first body covered with the bracket cover so as to support the bracket cover and forming a first side wall of the slot, and a second body provided opposite the first body and forming a second side wall of the slot.

The first body may comprise a stopping part configured to maintain a position of the bracket cover.

The stopping part restricts retraction of the bracket cover in a closed state and an opened state of the bracket cover.

The stopping part may comprise a first stopping portion configured to restrict retraction of the bracket cover so as to prevent opening of the bracket cover at a closed position of the bracket cover, and a second stopping portion configured to restrict retraction of the bracket cover at an opened position of the bracket cover.

The bracket cover and the ligating member may move integrally, and the stopping part may block the ligating member and apply position restraining force to the bracket cover through the ligating member.

The stopping part may form at least one blocking hump protruding from a surface of the first body toward the bracket cover.

The ligating member may comprise an elastic ligating member configured to apply pressure to the orthodontic wire. And the elastic ligating member may include an elastic protrusion configured to protrude toward the first body so as to be trapped into the stopping part, and a wire pressing part configured to apply pressure to the orthodontic wire toward the inside of the slot.

The elastic protrusion may be elastically deformable by press of the stopping part, for opening and closing of the bracket cover. In other words, the elastic protrusion is pressed by the stopping part and is thus elastically deformed while the bracket cover opens and closes.

One side surface of the second body, configured to form the second side wall of the slot, may comprise a ligating groove into which the wire pressing part is inserted.

The first body and the second body may protrude from a bottom body configured to connect the first body and the second body and to form a base surface of the slot, and the guide rails are formed at lower end portions of both sides of the first body.

The bracket cover may comprise a cover body configured to cover an upper surface of the first body, and cover wings formed on both sides of the cover body so as to extend toward the bottom body. The cover wings may comprise rail engagement parts formed at lower end portions of the cover wings and configured to be engaged with the guide rails.

The guide rails may comprise rail grooves configured to extend in a sliding direction of the bracket cover along lower end portions of both side surfaces of the first body.

And the ligating member may selectively block the slot so as to confine the orthodontic wire inside the bracket cover.

The ligating member may be provided inside the bracket cover and have elasticity.

The ligating member may move integrally with the bracket cover, and blocks the slot inside the bracket cover when the bracket cover closes the slot.

The ligating member may block the slot and apply pressure to the orthodontic wire toward the inside of the slot, in order to press the orthodontic wire, having a designated thickness or more, against a base surface of the slot.

The ligating member may comprise an elastic member having a plate shape, and a wire pressing part of the ligating member together with the bracket cover selectively blocks the slot.

The bracket cover closes the slot, the orthodontic bracket has a curved surface of a rounded shape in a closed state.

As described above, the bracket body may prevent the bracket cover from being separated from the bracket body in the thickness direction of the bracket body during sliding movement of the bracket cover. The bracket cover and the ligating member may simultaneously block the slot. When the bracket cover is closed, the edge and the front surface of the orthodontic bracket may form a curved surface of a convex shape, for example, a curved surface of a spherical shape or an oval shape.

In accordance with another aspect of the present invention, there is provided an orthodontic bracket including a bracket body configured to have a slot into which an orthodontic wire is inserted, a bracket cover movably mounted on the bracket body and configured to open and close the slot, and a ligating member provided in the bracket cover and configured to have elasticity, to move integrally with the bracket cover and to selectively block the slot so as to confine the orthodontic wire in the slot.

The bracket body may include a wire supporter configured to have the slot therein. And the wire supporter may include a first body covered with the bracket cover so as to support the bracket cover and configured to form a first side wall of the slot, and a second body provided opposite the first body and configured to form a second side wall of the slot.

The first body may include a stopping part configured to maintain a position of the bracket cover. The ligating member may include an elastic protrusion configured to protrude toward the first body so as to be trapped into the stopping part, and a wire pressing part configured to apply pressure to the orthodontic wire toward the inside of the slot, the elastic protrusion may be formed as one body with the wire pressing part, and pressed by the stopping part and thus be elastically deformable by press of the stopping part, for opening and closing of the bracket cover. A portion of the ligating member may be bent to be convex toward the first body and form the elastic protrusion, and a front end portion of the ligating member may be bent in the same direction as the elastic protrusion so as to form the wire pressing part.

The ligating member may further include a bending portion configured to be formed in a section between the wire pressing part and the elastic protrusion and to connect the wire pressing part and the elastic protrusion, and the bending part may be bent to be convex toward the bracket cover. Further, one side of the bending part may extend in the diagonal direction toward the second body so as to form the wire pressing part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention, which are able to achieve the objects of the present, will be described in detail with reference to the accompanying drawings. In the following description of the embodiments, like reference numerals are used to identify like elements throughout the different drawings, and a detailed description thereof is omitted.

The terms used in this specification are intended to describe embodiments of the present invention but are not intended to limit the scope of the present invention. It will be understood that although terms including ordinal number such as "first", "second", etc. may be used herein to describe various elements, these elements should not be limited by these terms. These terms are only used to distinguish one element from another.

It should be understood that, when an element is referred to as being "connected with" or "coupled to" another element, there may be intervening elements present, or the element may be directly connected with or coupled to the another element. In contrast, it should be understood that, when an element is referred to as being "directly connected with" another element, there are no intervening elements present.

Referring to FIGS. 1 to 5, an orthodontic bracket (hereinafter referred to as a 'bracket') according to one embodiment of the present invention includes a bracket body 100 having a slot 101 into which an orthodontic wire W is inserted, a bracket cover 200 mounted on the bracket body 100 and configured to open and close the slot 101, and a ligating member 300 provided in the bracket cover 200. In this embodiment, the ligating member 300 is an element configured to selectively block the slot 101 so as to confine the orthodontic wire W in the slot 101.

The bracket cover 200 may be movably provided on the bracket body 100, thus being capable of opening and closing the slot 101. The ligating member 300 may selectively block the slot 101 so as to confine the orthodontic wire W inside the bracket cover 200. Here, the ligating member 300 may be provided inside the bracket cover 200 and have elasticity. That is, the ligating member 300 may apply elastic pressure to the orthodontic wire W so as to push and press the orthodontic wire W into the slot 101.

In this embodiment, the ligating member 300 moves integrally with the bracket cover 200, and blocks the slot 101 inside the bracket cover 200 when the bracket cover 200 closes the slot 101. That is to say, the bracket cover 200 opens and closes the slot 101 outside the ligating member 300. And, when the bracket cover 200 is closed, the bracket cover 200 and the ligating member 300 simultaneously block the slot 101. On the other hand, when the bracket cover 200 is opened so as to open the slot 101, the ligating member 300 also moves integrally with the bracket cover 200 and thus releases blocking of the slot 101.

In order to press the orthodontic wire W, having a designated thickness or more, against the base surface of the slot 101 (the bottom surface of the slot 101 in FIG. 3), the ligating member 300 may block the slot 101 and apply pressure to the orthodontic wire W toward the inside of the slot 101.

In this embodiment, the ligating member 300 may be an elastic member having a plate shape, and a wire pressing part 310 of the ligating member 300 together with the bracket cover 200 may selectively block the slot 101.

In more detail, the bracket cover 200 is movably provided on the bracket body 100 so as to open and close the slot 101. For example, the bracket cover 200 may be rotatably connected to the bracket body 100 or be slidably mounted on the bracket body 100, thus being capable of opening and closing the slot 101 of the bracket body 100.

In this embodiment, the bracket cover 200 is provided on the bracket body 100 so as to be slidable, and thus opens and closes the slot 101. Further, the bracket body 100 supports the bracket cover 200, and thus guides sliding movement of the bracket cover 200.

Referring to FIGS. 4 to 10, the bracket body 100 may prevent the bracket cover 200 from being separated from the bracket body 100 in the thickness direction of the bracket body 100. That is to say, the bracket body 100 prevents the bracket cover 200 from being separated from the bracket body 100 in the thickness direction of the bracket body 100 (i.e., in a direction perpendicular to the sliding direction of the bracket cover 200) during sliding movement of the bracket cover 200.

For this purpose, guide rails 111a, which guide movement of the bracket cover 200 and prevent the bracket cover 200 from being separated from the bracket body 100, are provided on the bracket body 100. The guide rails 111a may be formed on both sides of the bracket body 100. On the assumption that the sliding direction of the bracket cover 200 is defined as the X-axis direction, the bracket cover 200 slides in a state in which the bracket cover 200 is engaged with the guide rails 111a provided on both sides of the bracket body 100, and may thus prevent separation of the bracket cover 200 from the bracket body 100 in the Y-axis direction (for example, in the thickness direction) and/or in the Z-axis direction (for example, in the width direction) which are orthogonal to the X-axis direction.

The bracket body 100 includes a wire supporter 110 having the slot 101 therein, and a base 120, which is adherable to a tooth surface (the surface, the lingual surface or the labial/buccal surface of a tooth), is provided on one side of the wire supporter 110. Therefore, one surface of the base 120 (the rear surface, or bottom surface of the base 120 in FIG. 6) forms a surface which is adhered to the tooth.

The wire supporter 110 is loaded with the above-described orthodontic wire W, and includes a first body 111 configured to form a first side wall of the slot 101 and a second body 112 configured to form a second side wall of the slot 101.

The first body 111 is covered with the bracket cover 200, and supports the bracket cover 200. The second body 112 is provided opposite the first body 111, and forms the second side wall of the slot 101, as described above. The first side wall is opposite the second side wall.

In this embodiment, the first body 111 includes at least one stopping part configured to maintain the position of the bracket cover 200. The stopping part 114a and 114b may function as stoppers which restrict retraction of the bracket cover 200 in the closed state and the opened state of the bracket cover 200, respectively. In this embodiment, the positions of the bracket covers 200 in the opened and closed states may be maintained by the stopping part.

The stopping part include a first stopping portion 114a which restricts retraction of the bracket cover 200 so as to prevent opening of the bracket cover 200 at the closed position of the bracket cover 200. The stopping part may further include a second stopping portion 114b which restricts retraction and separation of the bracket cover 200 at the opened position of the bracket cover 200.

Therefore, the first stopping portion 114a may maintain the closed state of the bracket cover 200, the second stopping portion 114b may prevent separation of the bracket cover 200 (breakaway from the guide rails 111a), and in this embodiment, the first stopping portion 114a and the second stopping portion 114b may maintain the position of the bracket cover 200 in the opened state. That is, the first stopping portion 114a may prevent the bracket cover 200 in the opened state from being closed, and prevent the bracket cover 200 in the closed state from being opened.

Further, the bracket cover 200 and the ligating member 300 move integrally, as described above, and in this embodiment, the stopping part 114a and 114b may block the ligating member 300 and thus apply position restraining force to the bracket cover 200 through the ligating member 300. That is to say, the position of the bracket cover 200 is indirectly restrained through the ligating member 300. Of course, a mechanism for maintaining the position of the bracket cover 200 is not limited to the above-described example.

Figure 13:
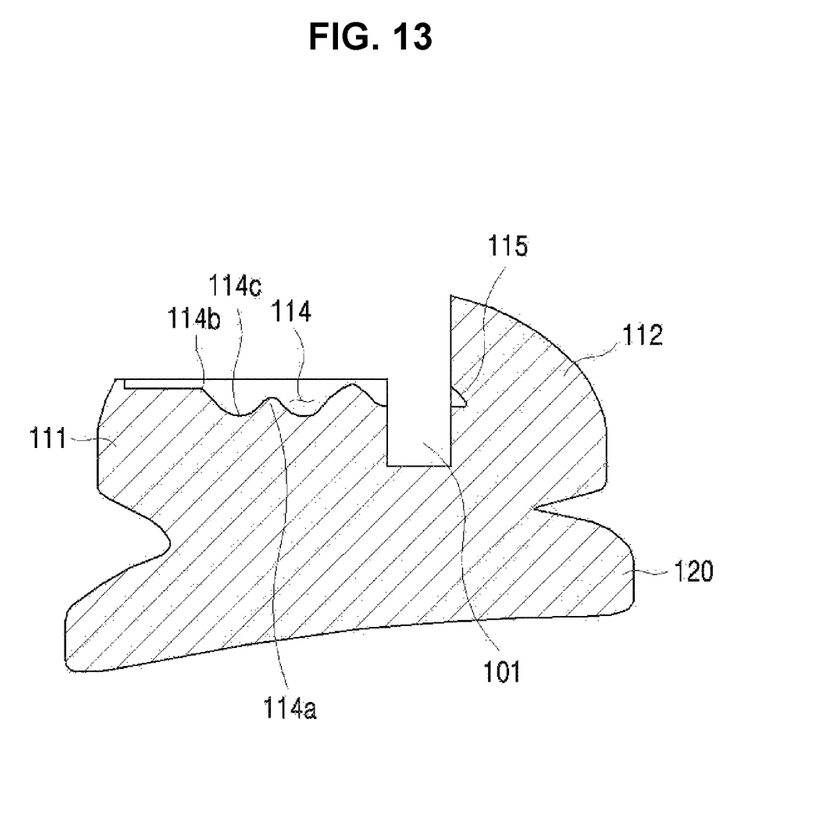
FIG. 13 is a cross-sectional view of the bracket body shown in FIG. 6.

Referring to FIGS. 6 to 13, the stopping part 114a and 114b may form at least one protrusion such as blocking hump, which protrude toward the bracket cover 200, on the surface (in more detail, the front surface, i.e., the upper surface in FIG. 13) of the first body 111. In this embodiment, the ligating member 300 may be an elastic ligating member which applies pressure to the orthodontic wire W, for example, a plate spring structure.

In more detail, the ligating member, i.e., the elastic ligating member, 300 includes the wire pressing part 310, which is configured to apply pressure to the orthodontic wire W, and an elastic protrusion 320, which protrudes toward the first body 111 so as to be trapped into the stopping part 114a and 114b.

In this embodiment, the front end of the ligating member 300 serves as the wire pressing part 310, blocks the slot 101, and thus apply elastic pressure to the orthodontic wire W toward the inside of the slot 101. Further, the elastic protrusion 320 may be pressed by the stopping part, particularly, the first stopping portion 114a, and thus be elastically deformed so as to pass over the first stopping portion 114a, during opening or closing process of the bracket cover 200.

The first body 111 and the second body 112 are provided on a bottom body 113 forming the base surface of the slot 101. The bottom body 113 connects the first body 111 and the second body 112, and forms the base surface (the bottom surface of the slot 101 in FIG. 3), as described above. Further, the first body 111 and the second body 112 protrude forwards (upwards in FIG. 3) from the bottom body 113. That is to say, the first body 111 and the second body 112 are provided on one side of the bottom body 113 (on the upper side in FIG. 13), and the base 120 configured to form the attaching surface to be adhered to the tooth is provided on the other side of the bottom body 113.

The bracket cover 200 includes a cover body 210 which covers a surface of the first body 111 (front surface, i.e., the upper surface of the first body 111 in FIG. 13), i.e., a surface of the first body 111 opposite the surface thereof on which the base 120 is formed, and cover wings 220 which are formed on both sides of the cover body 210 so as to be provided on both sides of the first body 111.

In this embodiment, the cover wings 220 extend toward the bottom body 113, and the guide rails 111a are formed on both sides of the first body 111. In addition, rail engagement parts 221 which are engaged with the guide rails 111a are formed on the cover wings 220. Therefore, a space 230 in which the ligating member 300 is installed and the first body 111 is accommodated may be formed inside the cover body 210 and the cover wings 220.

In more detail, the guide rails 111a are formed at the lower end portions of both sides of the first body 111, i.e., the boundaries between both sides of the first body 111 and the bottom body 113, and the rail engagement parts 221 are formed at the lower end portions of the cover wings 220 and thus slide along the guide rails 111a when the bracket cover 200 is opened and closed.

One of the guide rails 111a and the rail engagement parts 221 may be formed in a groove shape, and the other one thereof may be formed in a projection shape. In this embodiment, the guide rails 111a have a groove shape, the rail engagement parts 221 have a projection shape which is inserted into each of the guide rails 111a, and the guide rails 111a include rail grooves, which extend in the sliding direction of the bracket cover 200 along both side surfaces of the first body 111, particularly, the lower ends of the side surfaces of the first body 111.

The ligating member 300 according to this embodiment has a bended shape, and a movement space 114 for the ligating member 300 is formed on the surface of the first body 111. The stopping part, for example, the first stopping portion 114a and the second stopping portion 114b having the above-described protrusion shape, are formed in the movement space 114 of the ligating member 300, and the first stopping portion 114a serves as the first blocking protrusion, and the second stopping portion 114b serves as the second blocking protrusion.

The first stopping portion 114a is formed between the second body 112 and the second stopping portion 114b. That is, in this embodiment, the first stopping portion 114a and the second stopping portion 114b are sequentially formed at a predetermined interval in a direction from one side of the first body 111 forming the first side wall of the slot 101 to the other side of the first body 111.

Therefore, when the elastic protrusion 320 is located in a trapping groove 114c formed in a region between the first stopping portion 114a and the second stopping portion 114b, the opened state of the bracket cover 200 is maintained. When the elastic protrusion 320 passes over the first stopping portion 114a and is located outside the first stopping portion 114a (on a side opposite the trapping groove 114c), the closed state of the bracket cover 200 is maintained.

Figure 1:
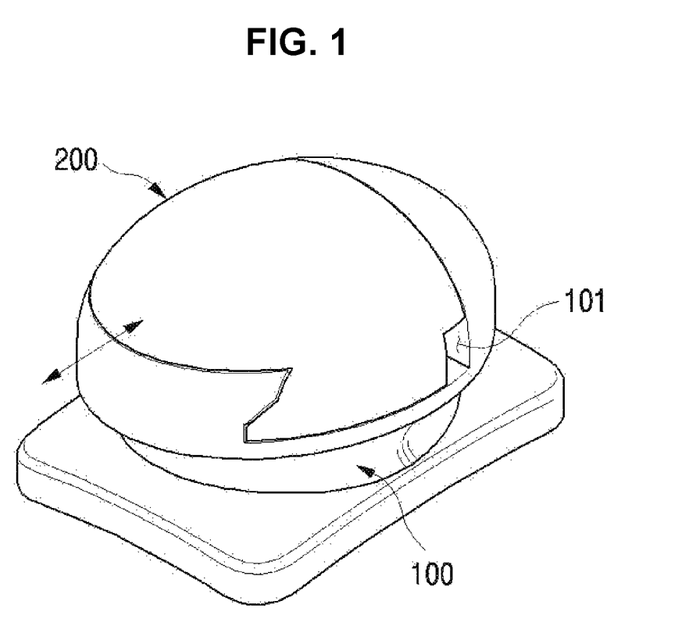
FIG. 1 is a perspective view illustrating an orthodontic bracket in accordance with one embodiment of the present invention.
Figure 2:
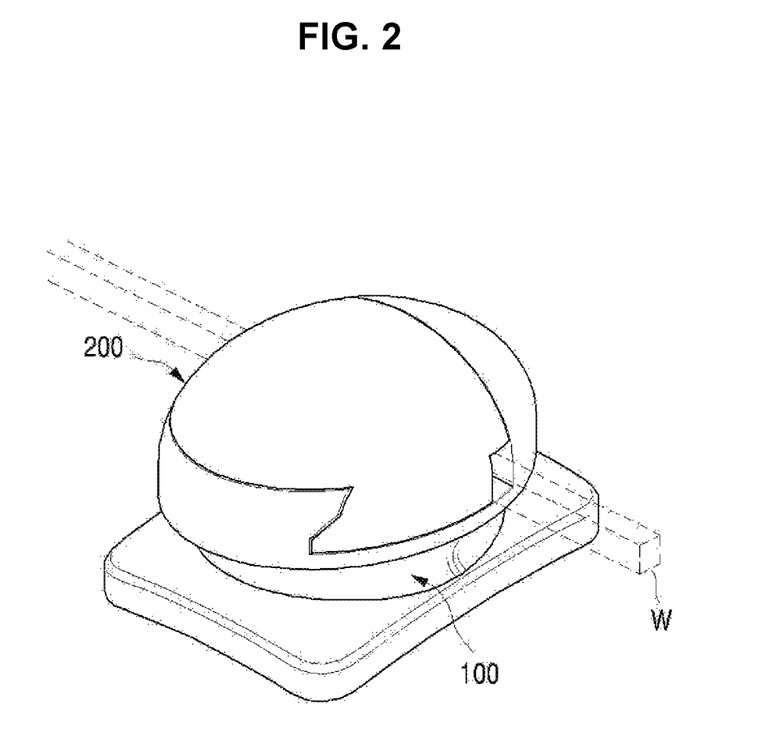
FIG. 2 is a perspective view illustrating a state in which an orthodontic wire is inserted into the orthodontic bracket shown in FIG. 1.
Figure 3:
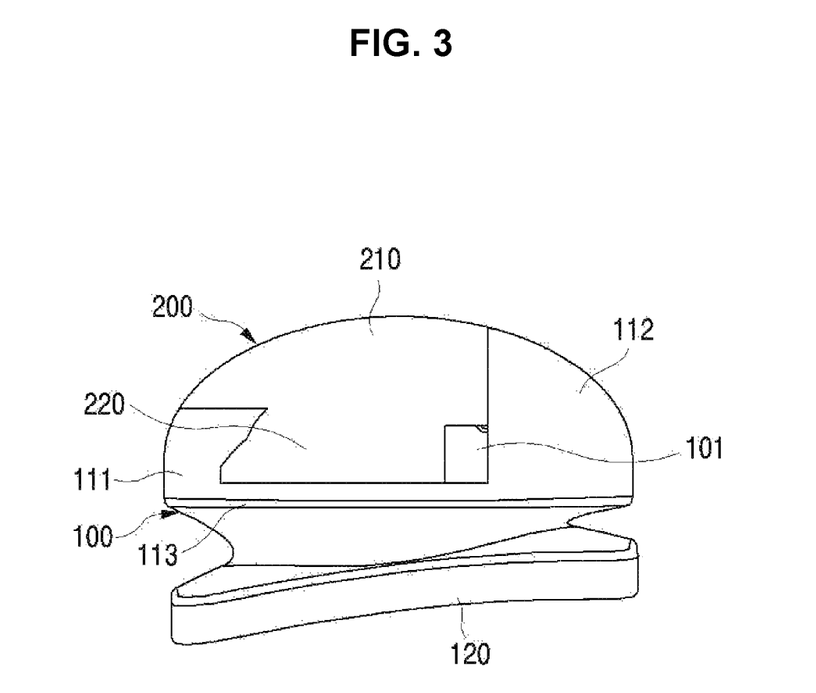
FIG. 3 is a side view of the orthodontic bracket shown in FIG. 1.
Figure 4:
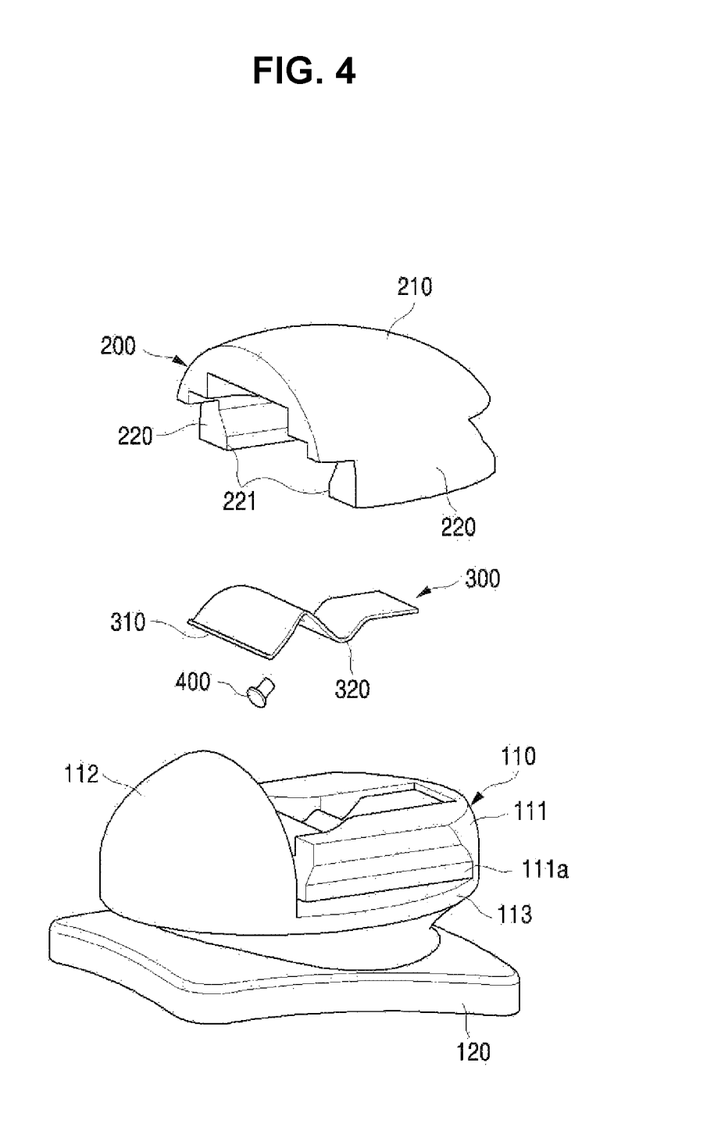
FIG. 4 is an exploded perspective view of the orthodontic bracket shown in FIG. 1.
Figure 5:
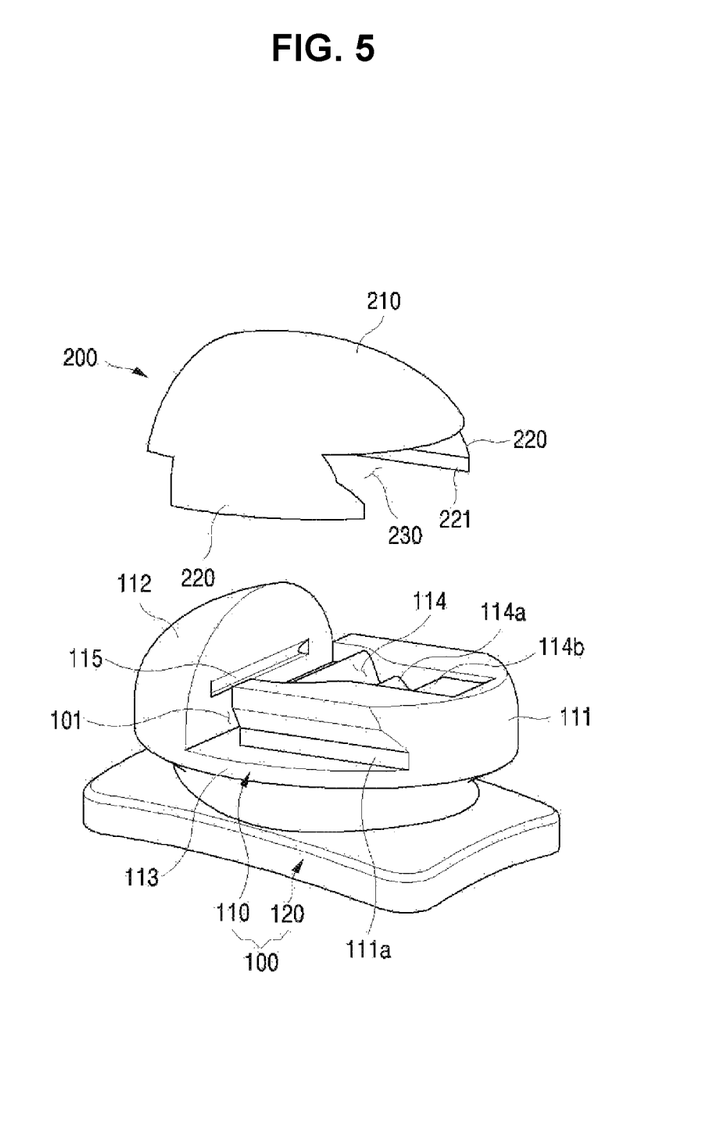
FIG. 5 is a perspective view of the orthodontic bracket shown in FIG. 1 in a state in which a bracket cover is opened.
Figure 6:
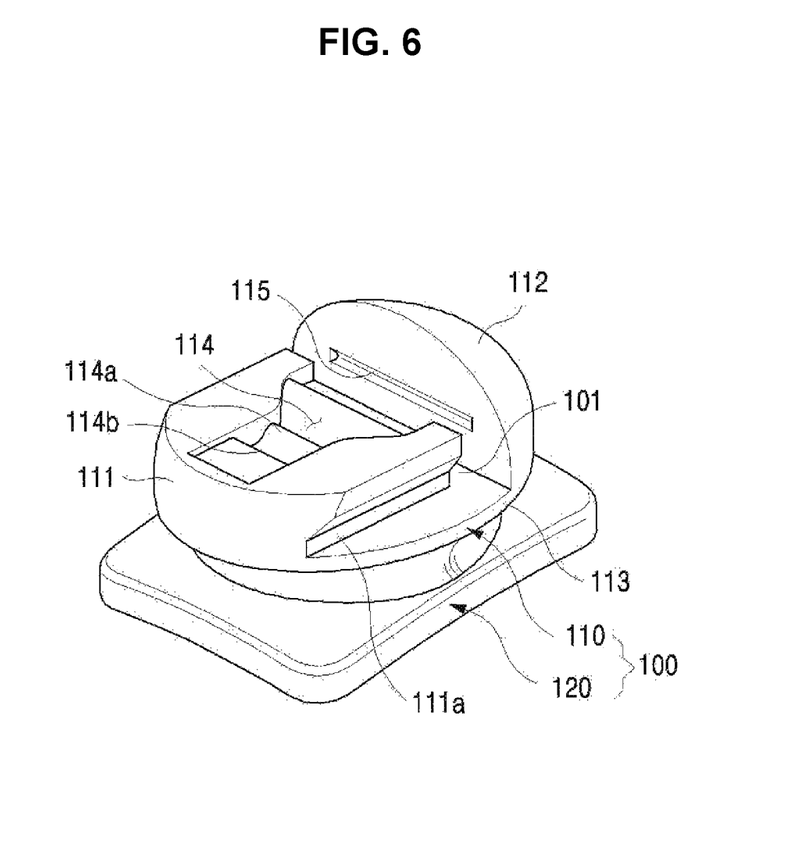
FIG. 6 is a perspective view illustrating a bracket body of the orthodontic bracket shown in FIG. 1.
Figure 7:
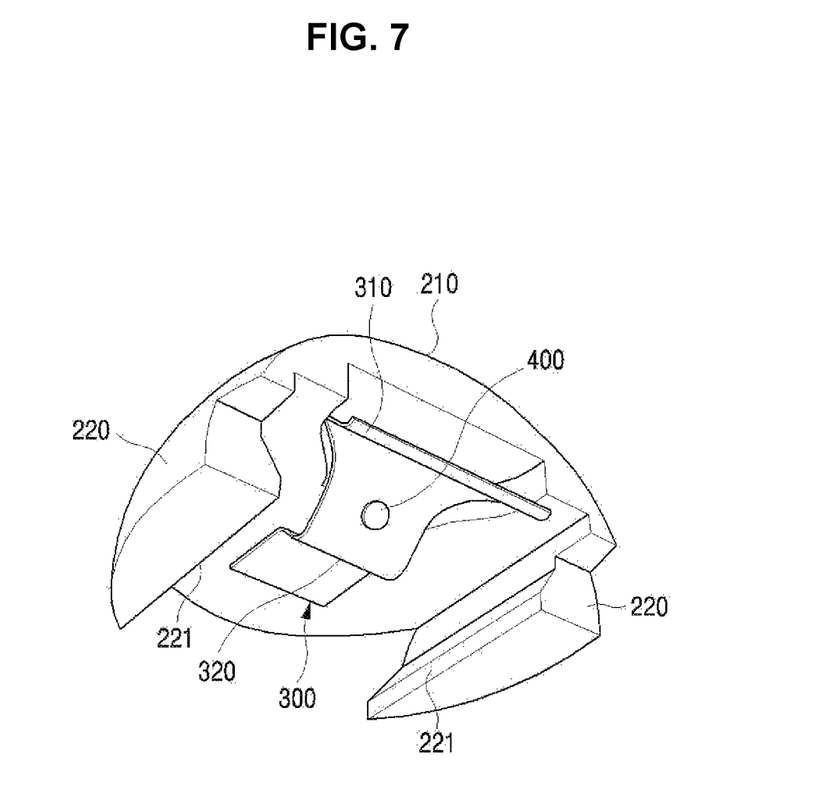
FIG. 7 is a perspective view illustrating a state in which a ligating member is coupled to the bracket cover of the bracket shown in FIG. 1.
Figure 8:
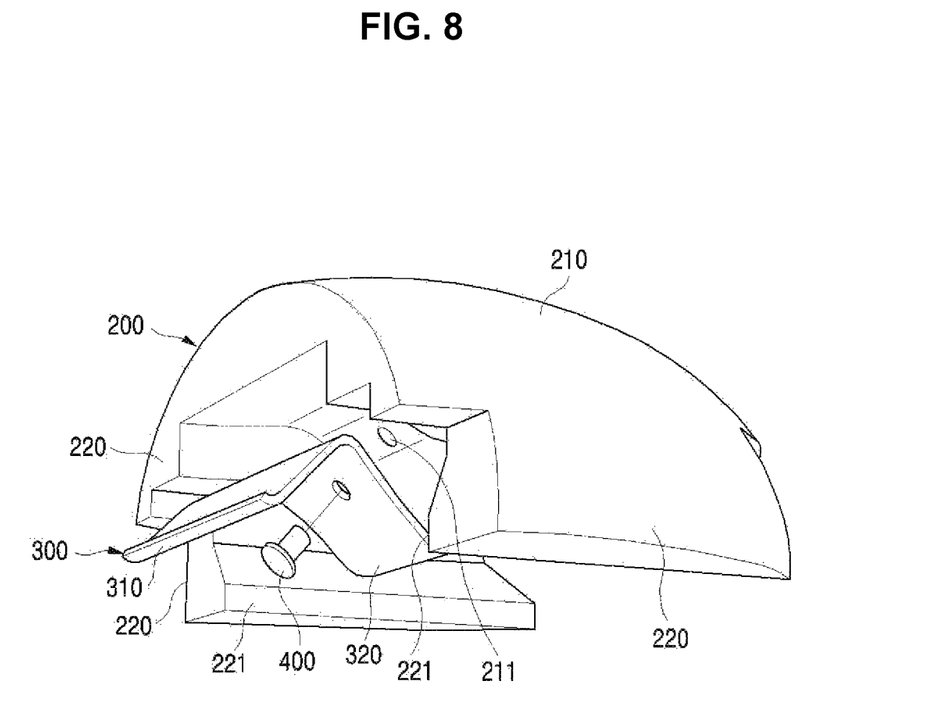
FIG. 8 is an exploded perspective view illustrating the bracket cover and the ligating member shown in FIG. 7.
Figure 9:
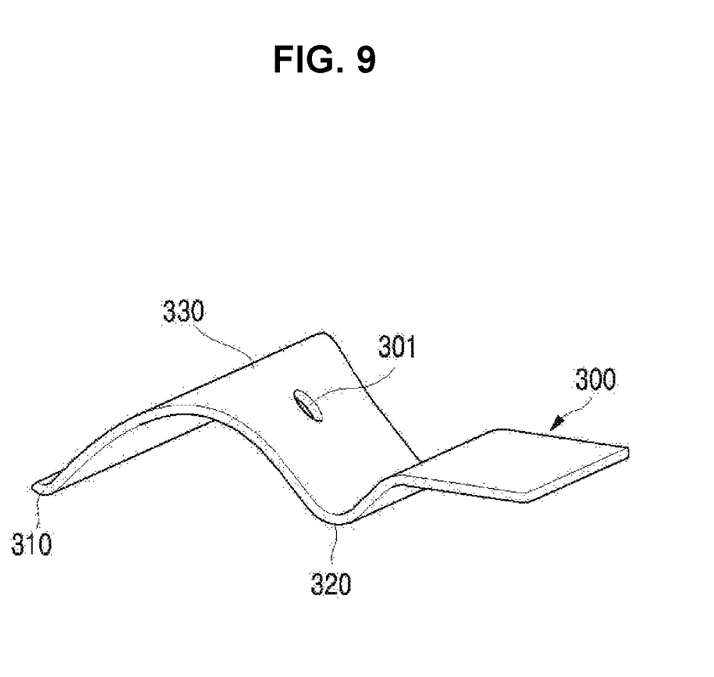
FIG. 9 is a perspective view of the ligating member shown in FIG. 8.
Figure 10:
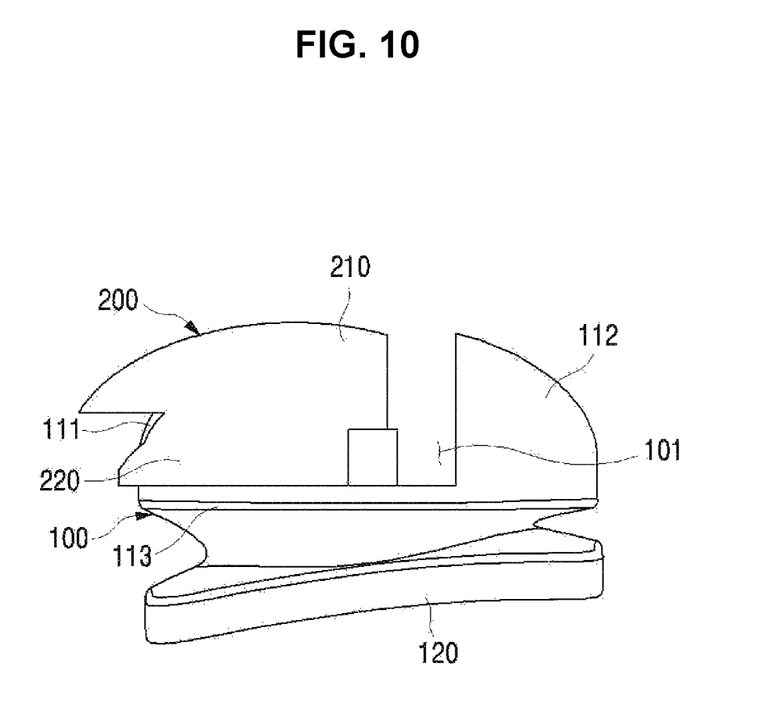
FIG. 10 is a side view illustrating a state in which a slot of the bracket shown in FIG. 1 is opened.
Figure 11:
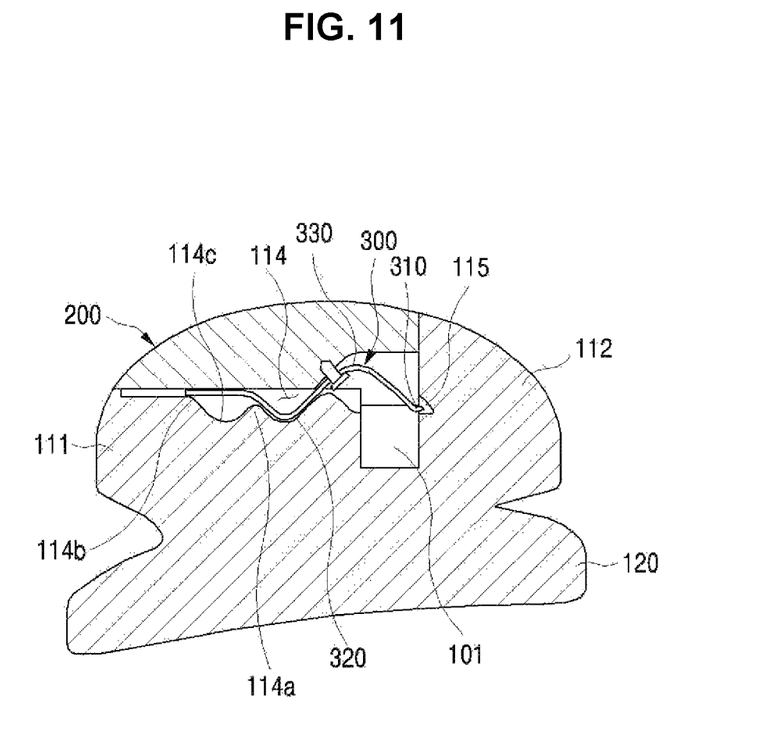
FIG. 11 is a cross-sectional view illustrating a state in which the slot of the bracket shown in FIG. 1 is closed.
Figure 12:
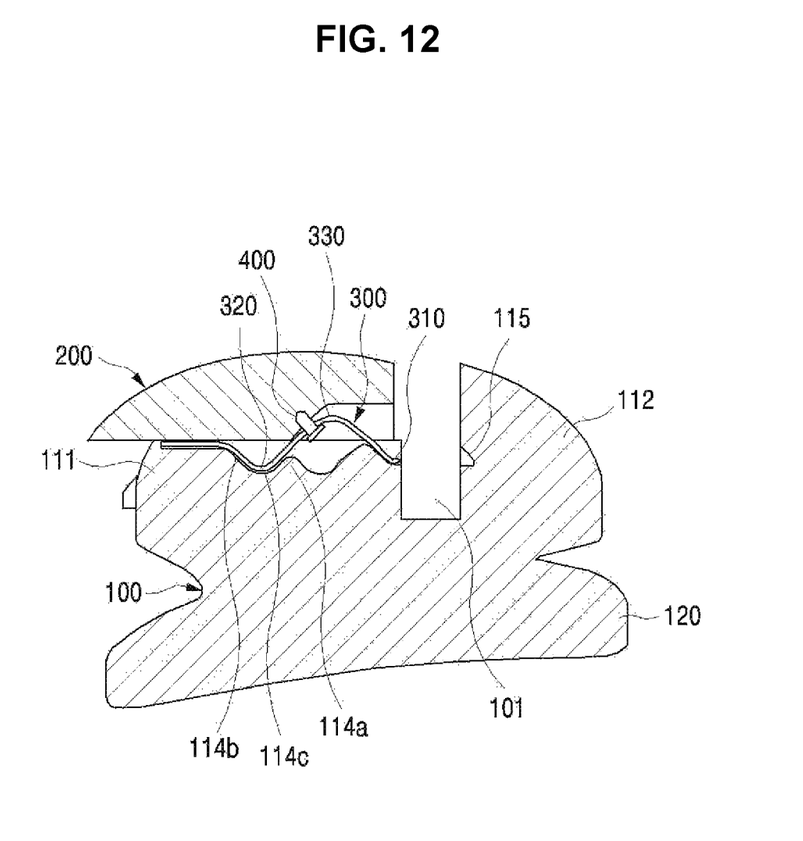
FIG. 12 is a cross-sectional view schematically illustrating the state in which the slot of the bracket shown in FIG. 1 is opened.

The ligating member 300 according to this embodiment is manufactured to have a wave shape, and a portion of the ligating member 300 is bent to be convex toward the first body 111 so as to form the above-described elastic protrusion 320. The front end of the ligating member 300, as shown in FIGS. 7 to 9, may be bent to be convex in the same direction as the elastic protrusion 320 and thus form the wire pressing part 310, and the wire pressing part 310 and the elastic protrusion 320 is formed as a single body. In this embodiment, the ligating member 300 is an elastic plate having a wave shape.

When force of a predetermined magnitude or more is applied to the bracket cover 200 in the sliding direction of the bracket cover 200 so as to open and close the bracket cover 200, the elastic protrusion 320 passes over the first stopping portion 114a and is pressed by the first stopping portion 114 so as to be elastically deformed, and after passing over the first stopping portion 114a, the elastic protrusion 320 is restored to an original state thereof and is thus trapped in one side or the other side of the first stopping portion 114a.

Further, the ligating member 300 has a section which extends from the elastic protrusion 320 toward the second body 112, and this section has a bending part 330 which is bent to be convex toward the bracket cover 200, more particularly, the cover body 210.

The bending part 330, which extends from the elastic protrusion 320 of the ligating member 300 toward the slot 101, forms the wire pressing part 310 extending from the top (ridge) of the bending part 330 in a diagonal direction toward the second body 112, and the bending direction is changed at the front end of the ligating member 300. For example, the front end of the ligating member 300 may be bent to be convex in the opposite direction of the bending part 330, or be bent to have a shape extending to a designated length parallel to the base surface of the slot 101. Of course, it is apparent that the shape of the ligating member 300 is not limited to the above-described example. In this embodiment, as shown in FIGS. 7 to 11, the bending part 330 is formed in a section between the wire pressing part 310 and the elastic protrusion 320, and the bending part 330 which is bent to be convex toward the bracket cover 200 connects the wire pressing part 310 and the elastic protrusion 320. Further, one side of the bending part 330 extends in the diagonal direction toward the second body 112 so as to form the wire pressing part 310.

The ligating member 300 is provided inside the above-described bracket cover 200, more particularly, inside the cover body 210. In this embodiment, the ligating member 300 is coupled to the inside of the cover body 210. The ligating member 300 may be detachably coupled to the bracket cover 200.

For example, the ligating member 300 may be fixed to the bracket cover 200 by a fastening member 400, such as a screw, and if the ligating member 300 is fixed to the cover body 210 by a screw, a screw hole 211 is formed in the cover body 210. Further, a screw coupling hole 301 is formed in the ligating member 300. Of course, a method for fixing the ligating member 300 to the bracket cover 200 is not limited to the above-described example.

One side surface of the second body 112 forming the second side wall of the slot 101 may include a ligating groove 115 into which the wire pressing part 310 of the ligating member 300 can be inserted. That is, when the bracket cover 200 is closed, the wire pressing part 310, more particularly, the front end of the ligating member 300, is inserted into the ligating groove 115.

The surface of the bracket cover 200 forms a curved surface of a rounded shape, and thus, when the bracket cover 200 closes the slot 101, the orthodontic bracket may have a rounded surface. In more detail, when the bracket cover 200 is closed, the outline and the surface of the orthodontic bracket opposite the base 120 form a curved surface of a convex shape, such as a spherical shape or an oval shape, thereby being capable of minimizing a sense of irritation, such as the tongue catching on the orthodontic bracket adhered to the tooth.

Although the drawings for describing this embodiment illustrate a structure in which the bracket cover 200 is coupled to the upper portion of the bracket body 100 and thus illustrate the base 120 as being disposed in the horizontal direction, the orthodontic bracket is actually adhered to a tooth in a state in which the orthodontic bracket is erected in the upright direction, for example, the base 120 is erected in the vertical direction.

Therefore, on the assumption that the surface of the base 120 to be adhered to the tooth is referred to as the rear surface of the orthodontic bracket, the wire supporter 110 is provided in front of the base 120, and the front surface of the wire supporter 110, particularly, the front surface of the first body 111, is covered with the bracket cover 200.

On the assumption that the surface of the base 120 to be adhered to the tooth is referred to as the rear surface of the orthodontic bracket, in this embodiment, the front surface of the orthodontic bracket and the edge portion of the orthodontic bracket form a curved surface of a convex shape, and when the bracket cover 200 is closed, the surface of the bracket cover 200 and the surface of the second body 112 may be smoothly connected without a step therebetween. Of course, the external shape of the above-described orthodontic bracket is not limited to a curved surface of a rounded shape.

As is apparent from the above description, an orthodontic bracket according to the present invention has the following effects.

First, the orthodontic bracket according to the present invention may precisely and consistently transmit force, for example, torque, of an orthodontic wire to a tooth, and minimize or prevent factors contributing to failure, such as deformation of or damage to a ligating member due to opening and closing of a slot.

Second, the orthodontic bracket according to the present invention includes the ligating member having elasticity inside a bracket cover configured to cover a bracket body, and allows the ligating member loaded in the bracket cover to move integrally with the bracket cover, thereby being capable of easily opening and closing the slot for ligating and releasing the orthodontic wire. Consequently, the orthodontic bracket according to the present invention may realize advantages of both of an active-type self-ligating bracket and a passive-type self-ligating bracket.

Third, the surface of the orthodontic bracket according to the present invention, for example, the outline and the front surface of the orthodontic bracket, form a curved surface of a rounded shape, thereby being capable of minimizing a sense of irritation, such as a tongue catching on the orthodontic bracket adhered to the tooth inside a mouth, and minimizing or preventing problems, such as damage to intraoral soft tissue due to the orthodontic bracket.

Fourth, the orthodontic bracket according to the present invention allows the ligating member, configured to press the orthodontic wire toward the inside of the slot, to be separated (removed) from the bracket cover, thereby allowing the ligating member to be selectively adhered to or detached from the bracket cover depending on a corresponding step of orthodontic treatment.

Fifth, the orthodontic bracket according to the present invention allows the bracket cover to move (open or close) only if force of a designated magnitude or more is applied to the bracket cover, thereby being capable of stably maintaining the positions of the bracket cover in the closed state and the opened state.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Therefore, the scope of the invention should be limited only by the accompanying claims and equivalents thereof.

What is claimed is:
1. An orthodontic bracket comprising:
a bracket body having a slot into which an orthodontic wire is inserted;
a bracket cover mounted on the bracket body and configured to open and close the slot; and
a ligating member provided in the bracket cover and configured to selectively block the slot so as to confine the orthodontic wire in the slot,
wherein the bracket body comprises a wire supporter having the slot therein,
wherein the wire supporter comprises:
a first body covered with the bracket cover so as to support the bracket cover and forming a first side wall of the slot; and
a second body provided opposite the first body and forming a second side wall of the slot, wherein the first body comprises a stopping part configured to maintain a position of the bracket cover, wherein the ligating member comprises an elastic ligating member configured to apply pressure to the orthodontic wire, wherein the elastic ligating member comprises:
- an elastic protrusion configured to protrude toward the first body so as to be trapped into the stopping part; and
- a bending part extending from the elastic protrusion and being convex toward the bracket cover, wherein an end of the bending part is located within the slot and directly applies a down force to the orthodontic wire due to an elasticity of the bending part when the bracket cover is in a closed position.

2. The orthodontic bracket according to claim 1, wherein the bracket cover is movably provided on the bracket body.

3. The orthodontic bracket according to claim 2, wherein:
the bracket cover is slidably provided on the bracket body so as to open and close the slot; and
the bracket body supports the bracket cover so as to guide sliding movement of the bracket cover, and prevents the bracket cover from being separated from the bracket body in a thickness direction of the bracket body.

4. The orthodontic bracket according to claim 3, wherein guide rails configured to guide movement of the bracket cover and to prevent the bracket cover from being separated from the bracket body are provided on the bracket body, the guide rails being formed on both sides of the bracket body.

5. The orthodontic bracket according to claim 4, wherein the bracket body further comprises a base adherable to a surface of a tooth is provided on one side of the wire supporter.

6. The orthodontic bracket according to claim 1, wherein the elastic protrusion is formed as one body with the bending part, and the end of the bending part is bent in a same direction as the elastic protrusion.

7. The orthodontic bracket according to claim 1, wherein the stopping part restricts retraction of the bracket cover in a closed state and an opened state of the bracket cover.

8. The orthodontic bracket according to claim 7, wherein the stopping part comprises:
- a first stopping portion configured to restrict retraction of the bracket cover so as to prevent opening of the bracket cover at a closed position of the bracket cover; and
- a second stopping portion configured to restrict retraction of the bracket cover at an opened position of the bracket cover.

9. The orthodontic bracket according to claim 1, wherein:
the bracket cover and the ligating member move integrally; and
the stopping part blocks the ligating member and apply position restraining force to the bracket cover through the ligating member.

10. The orthodontic bracket according to claim 9, wherein the stopping part forms at least one blocking hump protruding from a surface of the first body toward the bracket cover.

11. The orthodontic bracket according to claim 1, wherein the elastic protrusion is elastically deformable by press of the stopping part, for opening and closing of the bracket cover.

12. The orthodontic bracket according to claim 1, wherein one side surface of the second body, configured to form the second side wall of the slot, comprises a ligating groove into which the end of the bending part is inserted.

13. The orthodontic bracket according to claim 1, wherein the first body and the second body protrude from a bottom body configured to connect the first body and the second body and to form a base surface of the slot, and the guide rails are formed at lower end portions of both sides of the first body.

14. The orthodontic bracket according to claim 13, wherein the bracket cover comprises a cover body configured to cover an upper surface of the first body, and cover wings formed on both sides of the cover body so as to extend toward the bottom body,
wherein the cover wings comprise rail engagement parts formed at lower end portions of the cover wings and configured to be engaged with the guide rails.

15. The orthodontic bracket according to claim 14, wherein the guide rails comprise rail grooves configured to extend in a sliding direction of the bracket cover along lower end portions of both side surfaces of the first body.

16. The orthodontic bracket according to claim 1, wherein the ligating member has elasticity, is provided inside the bracket cover, is configured to move integrally with the bracket cover, and blocks the slot so as to confine the orthodontic wire when the bracket cover closes the slot.

17. The orthodontic bracket according to claim 16, wherein the ligating member blocks the slot and applies pressure to the orthodontic wire toward the inside of the slot, in order to press the orthodontic wire, having a predetermined thickness or more, against a base surface of the slot.

18. The orthodontic bracket according to claim 17, wherein the ligating member is an elastic plate having a wave shape and selectively blocks the slot together with the bracket cover.

19. The orthodontic bracket according to claim 1, wherein, as the bracket cover closes the slot, the orthodontic bracket has a curved surface of a rounded shape.

* * * * *